United States Patent [19]
Warner

[11] Patent Number: 5,452,946
[45] Date of Patent: Sep. 26, 1995

[54] HILL HOLDING BRAKE CONTROL SYSTEM

[76] Inventor: Donald A. Warner, 4644 Knopp Ave., Louisville, Ky. 40213

[21] Appl. No.: 228,420

[22] Filed: Apr. 15, 1994

[51] Int. Cl.$^6$ ................................................ B60K 41/28
[52] U.S. Cl. .......................... 303/24.1; 477/186; 477/195
[58] Field of Search .................... 303/24.1, 20; 477/196, 477/191, 195, 196, 197, 198, 189, 186, 187; 180/275, 276, 280, 282

[56] References Cited

U.S. PATENT DOCUMENTS

| | | | |
|---|---|---|---|
| 1,967,698 | 7/1934 | Whyte | 477/195 |
| 2,159,772 | 5/1939 | Schroedter | 477/191 |
| 2,949,989 | 8/1960 | Lindstrom et al. | 477/197 |
| 2,959,261 | 11/1960 | Hemphill | 477/197 |
| 3,923,127 | 12/1975 | Radcliffe et al. | 477/195 |
| 4,076,093 | 2/1978 | Mizuno | 477/195 |
| 4,915,131 | 4/1990 | Cha | 477/196 |

FOREIGN PATENT DOCUMENTS

| | | | |
|---|---|---|---|
| 3-11901 | 1/1991 | Japan | 477/186 |
| 8700489 | 1/1984 | WIPO | 477/186 |

*Primary Examiner*—Matthew C. Graham
*Attorney, Agent, or Firm*—Laurence R. Brown

[57] ABSTRACT

This invention provides a hill-holder control system for operating vehicle brakes of a nature readily retrofit on existing vehicles. This system solves the problem of stopping and starting motion as when a traffic signal is encountered upon an upwardly inclined roadway while preventing backward motion of the vehicle. This problem is even more particularly evident in vehicles having a clutch where a foot must be removed from the brake to the accelerator and the clutch disengaged in a critical rhythmic sequence. Provisions are made so that backwards motion under control of the driver is possible in an automated embodiment of the invention by way of a manual override braking switch. In order to actuate the braking, a sensor is conditionally responsive solely to rearward movement of said vehicle is provided for latching a braking solenoid into braking position for release, for example, the braking is not actuated under the conditions that the accelerator lever is depressed or that reverse gear is engaged. The braking solenoid in a preferred embodiment is coupled to the braking lever so that it may be retrofit on existing vehicles. The system is operable both in vehicles with and without clutches and with mechanical, hydraulic or air brake systems. A novel proximity braking switch for sensing vehicle rearward motion sensor operates a braking signal switch magnetically from a rotatable member that rotates when the vehicle is moving backward.

2 Claims, 3 Drawing Sheets

HILL HOLDING BRAKE CONTROL SYSTEM

TECHNICAL FIELD

This invention relates to a system for preventing a vehicle from rolling backward inadvertently when stopped on an upwardly slanted roadway, and more particularly it relates to a retrofittable system that applies the vehicle brakes automatically when a rearward motion is encountered as a driver is attempting to brake the vehicle to prevent motion and/or when moving a foot from the brake to the accelerator pedal to move away from a stopped position.

BACKGROUND ART

The hill-holding problem has been long recognized and has been resolved in various ways in the prior art. The problem is incurred, typically, by braking a vehicle for a traffic signal on an upwardly inclined roadway, then removing the foot from the brakes to move the vehicle forward. Thus, the vehicle can move backward before the engine is engaged to transmit enough power to overcome the tendency to move backward. Sometimes there is a problem with heavy loads and on steep inclines that more than normal manual braking force is necessary, so that backward vehicle motion may occur unexpectedly if the driver does not consciously keep the brake pedal jammed down. There is at least in the interim time when the foot is moved from the brake to the accelerator pedal when the vehicle tends to move backward down the incline, an accompanying danger to a following vehicle or pedestrian. This tendency is even more pronounced in vehicles operated by a clutch, which disconnects the engine power from the drive drain so that the tendency to roll backward is unimpeded by engine braking.

A prior art class of hill-holding braking systems using the depression of the clutch pedal to operate the vehicle brakes, is typified by the following U.S. Patents: A. G. Taig, et al., U.S. Pat. No. 4,582,184, Apr. 15, 1986 for Brake Control Device; A. Mizuno, U.S. Pat. No. 4,093,050, Jun. 6, 1978 for Clutch and Accelerator Controlled Brake Lock for Vehicles; J. Y. Ha, U.S. Pat. No. 4,515,259, May 7, 1985 for Clutch-Operated Hill Holder Brake System; Y. K. Kim, U.S. Pat. No. 687,080, Aug. 18, 1987 for Clutch Brake Method; K. Kojima, et al., U.S. Pat. No. 4,802,563, Feb. 7, 1989 for Braking Force Holding Device for an Air Brake System; and S. L. Radcliffe, et al., U.S. Pat. No. 3,923,127, Dec. 2, 1975 for Vehicle Braking System. However, these systems are not operable with vehicles having automatic transmissions. Furthermore even if the brakes are applied by the clutch, particularly under loaded conditions or on steep hills, a vehicle will move backward in the interim when the foot is moved from the clutch to the accelerator to engage gears and apply enough engine power to move forward.

Another class of brake control devices rely upon the sensing of an inclined vehicle position to apply the brakes. Typical U.S. Patents are S. Shoji, et al., U.S. Pat. No. 4,247,154, Jan. 27, 1981 for Brake Control Valve; W. K. Messersmith, et al., U.S. Pat. No. 4,660,691, Apr. 28, 1987 for Vehicular Hill Holder System Having a Control Circuit Responsive to Vehicular Attitude, Clutch Position, and Gear Position; and A. G. Taig, U.S. Pat. No. 4,538,710, Sept. 3, 1985 for Mechanical Brake Control Device. However, it is not the inclination of the vehicle that causes potential damage requiring correction, but the actual backward movement of the vehicle. For example, if a rear wheel enters a rut or pothole, an inclination might be detected and thus the brakes may become locked in place under undesirable circumstances.

Also, there are some braking control systems that tend to alter the drivers normal braking sequence or habits when stopping and restarting on an upwardly inclined roadway. This is not safe, since it requires judgment when the roadway is inclined upwardly, a perspective that is not certain from visual inspection. Also, it is preferable to drive normally without having to learn to operate a special braking procedure, or to rely upon a hill-holding brake feature so that precautionary driving measures are not habitually used. Thus, a driver is expected under normal circumstances to be alert to the danger of backward motion on inclines and to use the brakes, transmission and accelerator in such a manner as to prevent backward roll under usually encountered conditions, with no fail safe provisions in the event of an error of judgement.

Other problems with such prior art devices include the failure to provide a system operable substantially universally over a wide range of different vehicles with braking systems that may be operated mechanically, hydraulically or with air. In this respect mechanically actuated and reacting systems are difficult to install and may require alterations of vehicle body structure or mechanisms. Nor are the prior art systems in general adapted to simply retrofit a hill-holding braking system by installation upon existing vehicles after manufacture without significant alteration of the vehicle.

It is accordingly an object of the invention to overcome the foregoing prior art problems and to provide an improved and simplified safety override brake control system operable for hill holding without disturbing operator control except under those conditions when actual backward motion is sensed on inclined roadways without engagement of the vehicle reverse gear.

Other objects, features and advantages of the invention will be found throughout the following description, drawings and claims.

DISCLOSURE OF THE INVENTION

The hill-holding braking system of this invention has an electric control system cooperatively interacting with existing vehicle parts so that it may be universally applicable and retrofit onto previously manufactured vehicles. Electrical wiring does not in general interfere with any mechanical features or require body modification of the vehicle. In basic operation, the brake system overrides manual driving conditions only when the vehicle actually moves backward with the exception that the system is disabled when the vehicle is put into reverse gear for intentional backward motion. Thus, a backward motion sensor is critical to the operation and reliability of the system, and former clutch actuated control systems are obsoleted.

A novel and reliable backward motion detector is provided that operates magnetically and thus requires no mechanical interface with existing vehicle mechanisms which can wear or require critical placement and adjustment. This detector also may be hermetically sealed so that it is operable in the presence of adverse weather conditions and accumulated road film and debris. Because of its magnetic non-engagement operating feature, it also tolerates significant mechanical vibration and distortion encountered in the normal course of vehicle travel.

In operation the hill-holder control system responds to the manually operable accelerator pedal as it moves away from an engine idling position when the transmission is not in reverse gear to prevent the system from braking. However when the vehicle moves backward and is not in reverse gear, the system responds to automatically latch the brakes into a braking position. The operation and construction of the invention is hereinafter set forth in more detail with reference to the accompanying drawings.

BRIEF DESCRIPTION OF THE DRAWINGS

In the drawings like reference characters refer to similar features in the various views to facilitate comparison, and.

THE PREFERRED EMBODIMENT

Figure 1:
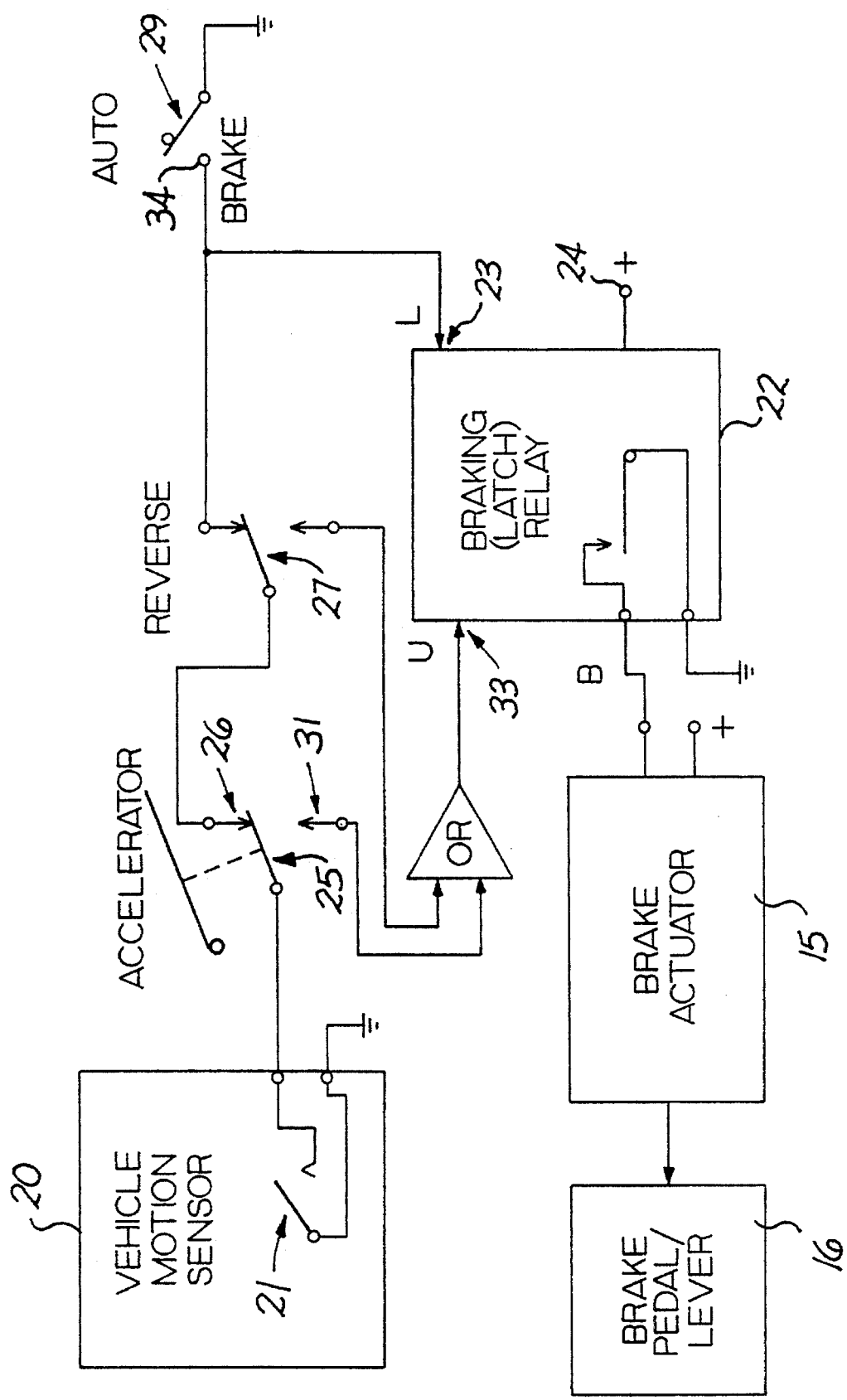
FIG. 1 is a schematic circuit diagram of the electrically operable hill-holding braking system afforded by this invention.

Now with reference to FIG. 1, the operation and construction of the electrically wired hill-holder control system of this invention is exemplified by the block schematic circuit drawing. The vehicle brakes are operated by a controllable braking force device shown as brake actuator 15, which serves to mechanically operate the brake lever system of a vehicle, preferably in the vicinity of the brake pedal 16. The actuator 15 may be a power electric solenoid, a hydraulic ram or an air operated cylinder, for example, of sufficient output force to apply the brakes and hold them in applied condition until released by the control system. The ram or cylinder type brake actuator 15 is operated by an electrically actuated hydraulic or air control valve of the type well known in the art. Preferably the rest of the control system is electrical in nature for easier retrofit into existing vehicles.

The critical braking motivator is the vehicle motion sensor 20, which electrically rather than mechanically detects backward motion of the vehicle encountered on upwardly inclined roadways without recognition of the physical inclination of the car. A momentary closeable switch 21 thus serves the purpose of latching the latching relay 22 at (L) latching terminal 23 by completing the electrical circuit through the relay coil and latching contacts from the battery terminal 24 to ground.

The latching relay 22 can be latched only conditionally by the motion sensor 20 upon one condition that the accelerator pedal 25 is non-depressed away from its normal idling position to complete the circuit through contact 26. Another condition is the intervening electrical detection switch 27 with normally closes contact 28 requiring that the transmission is not in reverse gear. Thus, the brakes cannot be automatically applied by this system and latching relay 22 either when the accelerator is not in its idling position or when the transmission is in reverse.

Should the braking relay not be a latching relay, the motion sensor switch 21 must be maintained closed for the entire time the brakes are to be applied. In that operating option, the unlatching of the brakes could occur by opening of the accelerator switch 25 when the foot is used to move the accelerator out of the engine idling position. Similarly the unlatching of the brakes would occur when the transmission is placed into reverse thus opening the switch 27. In the presence of latching relay 22 however, the OR circuit 30 permits either a momentary signal from accelerator switch contact 31 when the accelerator pedal is manually pushed away from idling position, or a momentary signal at reverse gear sensor switch 27 closing contact 32 when reverse gear is engaged to unlatch relay 22 at the unlatching (U) terminal 33. Of course, variations of requirements of different latching relays can be met to momentarily latch the brakes into locked position and to unlatch when the accelerator or reverse gear is engaged. Thus, it is recognized that variations of this control circuit may be employed within the scope of the present invention, and that the circuits and switching decisions may be achieved by solid state switching and sensing means, for example.

Note that the manual control switch 29 available to the driver can be switched into braking position for closing contact 34 to permanently latch the relay 22 into braking position, and thus can provide a manual control braking option to the driver for either hill-holding or for other purposes including emergencies and parking.

Figure 3:
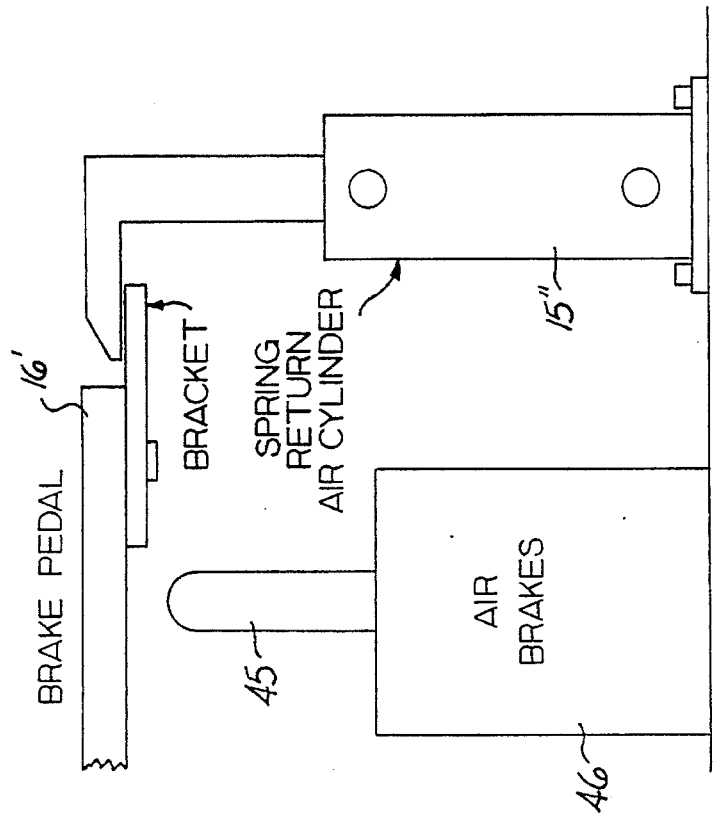
FIGS. 2 and 3 are respectively brake actuator sketches for automobiles and trucks operated in accordance with this invention.
Figure 2:
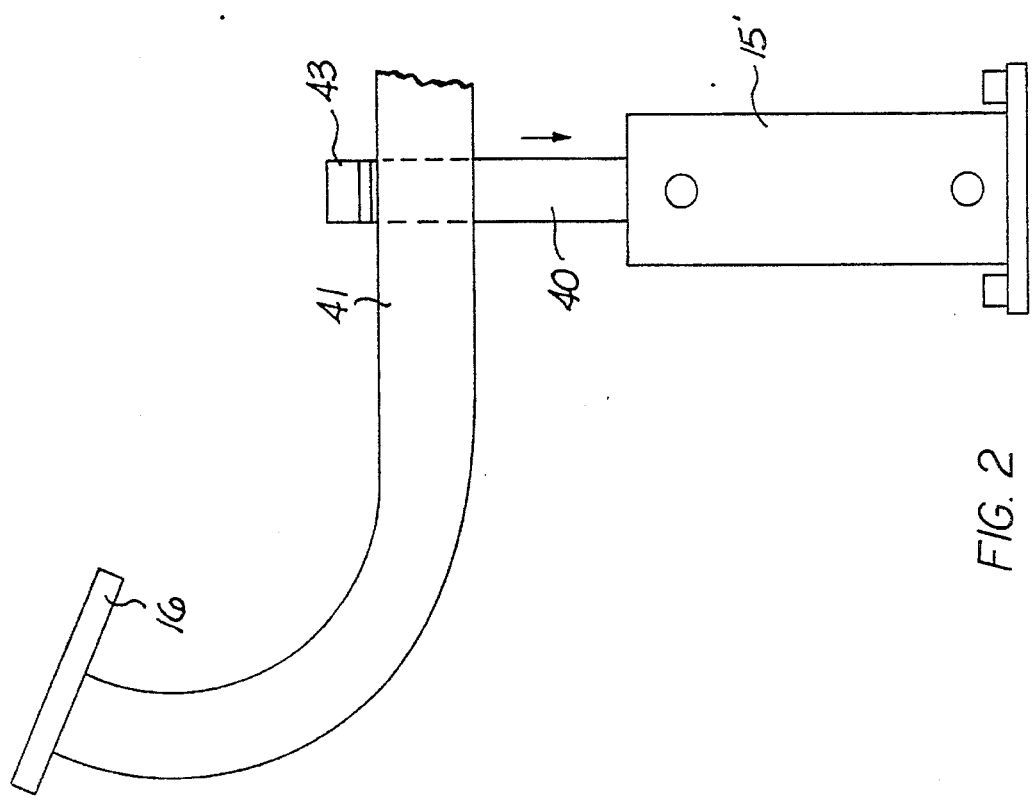

The braking relay 22 thus provides an electrical signal such as the closing of switch 35 at braking (B) terminal 36 for control of the power brake actuator 15' as seen in FIG. 2. This brake actuator 15' provides reciprocating shaft 40 for pulling the brake lever 41 downward to apply the brakes. In the normally inactive position shown the flange 43 does not interfere with braking and permits the brake pedal to return to its normal non-braking condition unless the actuator 15' is energized. In another embodiment in FIG. 3, for truck air brake systems, the brake actuator 15" may be a spring return air cylinder in its non-actuated normal position with flange 43 permitting brake pedal 16' to rest in its non-braking posture without depressing valve member 45 of the air brake system 46.

Figure 5:
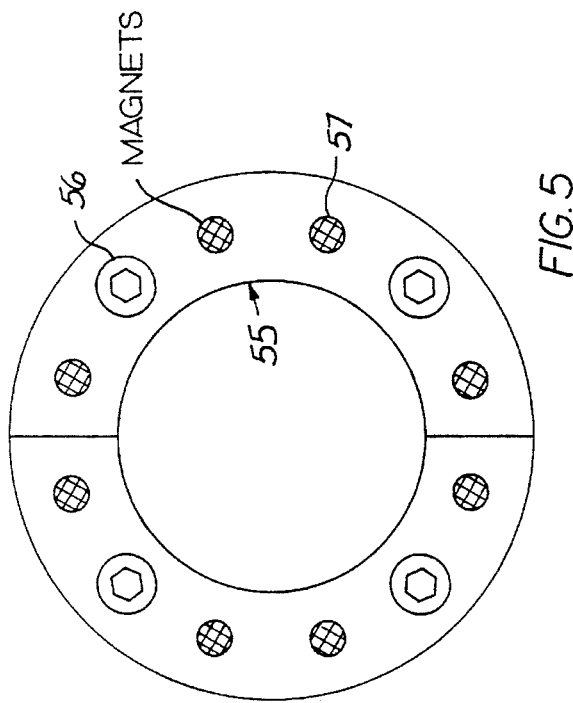
FIG. 5 is an end view of an adaptor plate for mounting part of the motion sensor on a vehicle rotatable shaft that changes direction of rotation with forward and backward vehicle movement.
Figure 6:
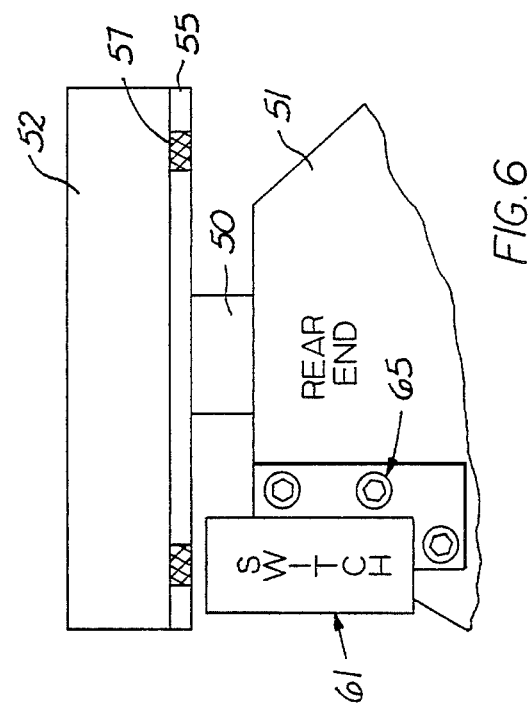
FIG. 6 is a top view sketch of a motion sensor mount with an electrical switch part mounted on the vehicle frame.
Figure 4:
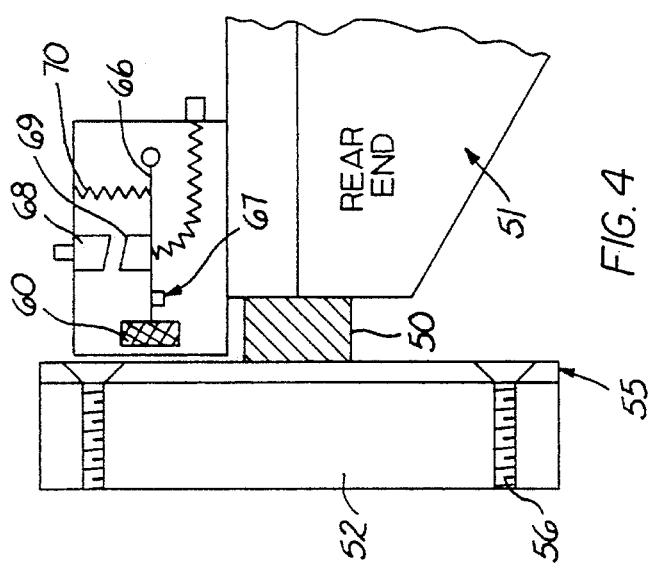
FIG. 4 is a schematic side view sketch, partly in section, of a rearward motion detection sensor afforded by this invention.

The construction of an embodiment of the vehicle motion sensor (20) for detecting backward motion of a rear wheel drive vehicle is illustrated in FIGS. 4 to 6. A rotary shaft 50 extending forwardly from the rear end differential 51 rotates in opposite directions as the vehicle moves forward or backward. The yoke 52 couples the differential shaft 50 to the drive shaft 54 which transmits engine power to the rear wheels in this type of drive. Two halves of an adapter ring plate 55, made of non-magnetic material with magnets 57 embedded to direct a magnetic field outwardly from the rear face of yoke 52. The plate 55 is attached to yoke 52 by means of screws 56.

Thus the magnets 57 dispersed at a set of radially separated positions about a circular arc will rotate upon movement of the vehicle respectively in either a clockwise or counterclockwise direction for motion of the vehicle in opposite directions. This movement of magnets 57 past magnetic member 60 will create a magnetic field that reacts on magnetic member 60 within the preferably hermetically sealed switch casing 61 to tend to move the magnetic member 60 upwardly or downwardly as shown in the drawing, when the switch casing 61 is mounted adjacent to the yoke 52 on the rear side. The hermetic sealing together with the non-mechanical nature of the switching assures reliability in the presence of road film, dirt and moisture encountered under normal use of a vehicle.

In this embodiment, the switch casing 61 is bolted to the vehicle frame by means of bolts 65. When attempting to move magnetic member 60, which is attached to switch armature 66, downwardly the stop 67 prevents any change of the switch contacts 68, 69. These contacts 68, 69 are held normally open by spring 70 so that armature 67 rests against stop 67. Thus downward motion of the magnetic member 60 would represent forward motion of the vehicle.

However, when the direction of yoke 52 changes for backward motion of the vehicle, the magnetic member 60 can move upwardly compressing spring 70 to close contacts 68, 69 and thus give a momentary electric signal as each magnet 57 moves by. The contacts for example could be coupled to a horn or sounder to give an intermittent reverse alarm signal as long as a truck is backing up. However in connection with the hill-holder braking system of this invention, the momentary contact closure will automatically engage the brakes to prevent any further backward vehicle motion. Other backward motion detectors may be used, and variations of this embodiment may be necessary, particularly with front wheel drive vehicles. Thus, the hill-holding braking system of this invention is adaptable to different automobiles and trucks, and can either be supplied in simple ready to install retrofit kits without significant mechanical change or built into vehicles on the assembly line.

Having therefore advanced the state of the art, those features of novelty describing the nature and spirit of the invention are set forth with particularity in the following claims.

I claim:

1. A hill-holder control system for operating vehicle brakes, comprising in combination:

a vehicle with a manually operable accelerator pedal movable away from an idling position to move the vehicle and a transmission with a manually selectable reverse gear for moving the vehicle backwards, sensing means for producing an electric vehicle motion signal solely in response to rearward movement of said vehicle when the reverse gear is not selected, an electric latching relay responsive to said electric vehicle motion signal to change from a non-braking condition and latch into a braking condition, vehicle braking means responsive to said latching relay in its braking position to apply the vehicle brakes, unlatching means for restoring said latching relay to a non-braking condition when either an accelerator actuating lever is manually moved away from an idling position or the reverse gear is engaged, a rotary shaft on said vehicle that rotates in two opposite directions for forward motion and reverse motion of the vehicle, magnet means mounted to rotate with said shaft in said two directions, and an electrical motion detection switch with electrical contacts magnetically responsive to said magnet means to produce said electrical signal upon rotation of the shaft only during backward motion of the vehicle wherein said sensing means further comprises a pair of switch contacts having a movable arm biased by a spring against a limiting position defining a first contact switching position, a magnetically attracted member operable to move said movable arm into a position defining a second contact switching position for the pair of switch contacts in response to an external magnetic field, and a mount for fixing said magnetically attracted member in an arc of rotation of said magnet means rotating with said shaft so that rotation of the shaft in one direction produces a magnetic force retaining the switch contacts in said limiting position and rotation of the shaft in the opposite direction produces a magnetic force for moving the movable arm into the position defining a second contact switching position.

2. A backward motion sensing detector for a motor vehicle comprising in combination, an adaptor yoke for mounting to rotate with a rotating shaft of the motor vehicle that changes direction of rotation with movement of the vehicle in forward and backward directions, a plurality of spaced apart magnets carried by said yoke at radially disposed positions to rotate in a ringlike pattern about a common axis of rotation with movement of the vehicle, a magnetically actuated switch for mounting upon framework of the vehicle to be spaced from the yoke and be disposed in a position to operate switch contacts when the magnets are rotating only in the direction indicating backward motion of the vehicle, said switch having a magnetically operable armature arm and a set of switch contacts operable in response to movement of the armature arm to produce an electrical switching signal, and mounting means for relatively mounting said yoke and said switch for operation of said switch contacts in response to rotation of said magnets on said yoke past the magnetically movable armature arm in a single direction of rotation.

* * * * *